United States Patent [19]

Forbes et al.

[11] 3,907,511

[45] Sept. 23, 1975

[54] APPARATUS FOR COUNTERCURRENT CATALYTIC CONTACT OF A REACTANT STREAM IN A MULTIPLE-STAGE PROCESS

[75] Inventors: James T. Forbes, Arlington Heights; James E. Gantt, Elmwood Park, both of Ill.

[73] Assignee: Universal Oil Products Company, Des Plaines, Ill.

[22] Filed: Sept. 20, 1973

[21] Appl. No.: 399,775

[52] U.S. Cl. .................................... 23/288 G
[51] Int. Cl. ..................................... B01j 9/12
[58] Field of Search....... 23/288 G, 288 R; 208/165, 208/169, 171

[56] References Cited
UNITED STATES PATENTS

| | | | |
|---|---|---|---|
| 2,512,562 | 6/1950 | Cummings | 23/288 R |
| 3,706,536 | 12/1972 | Greenwood et al. | 23/288 G |
| 3,799,866 | 3/1974 | Lengemann | 23/288 G X |

Primary Examiner—Morris O. Wolk
Assistant Examiner—Michael S. Marcus
Attorney, Agent, or Firm—James R. Hoatson, Jr.; Robert W. Erickson; William H. Page, II

[57] ABSTRACT

A unitary, multiple-stage reaction system for countercurrently contacting a fluid reactant stream with catalyst particles movable through the system via gravity-flow. The reaction zones, or stages, are vertically stacked in a single chamber wherein catalyst particles flow from one annular-form bed to the next lower annular-form bed. A first portion of the hydrocarbonaceous charge stock flows downwardly into the lowermost reaction zone, laterally (outward to inward flow) through the annular-form catalyst bed into a center reactant conduit, is admixed with the second portion of the charge stock, flows upwardly through the reactant conduit into the next upper zone and laterally (inward to outward flow) through the annular-form catalyst bed. A preferred embodiment involves three reaction zones within the reaction chamber, with heat-exchange provisions between the middle and upper zones.

7 Claims, 2 Drawing Figures

US Patent  Sept. 23, 1975  3,907,511
Figure 1
Figure 2
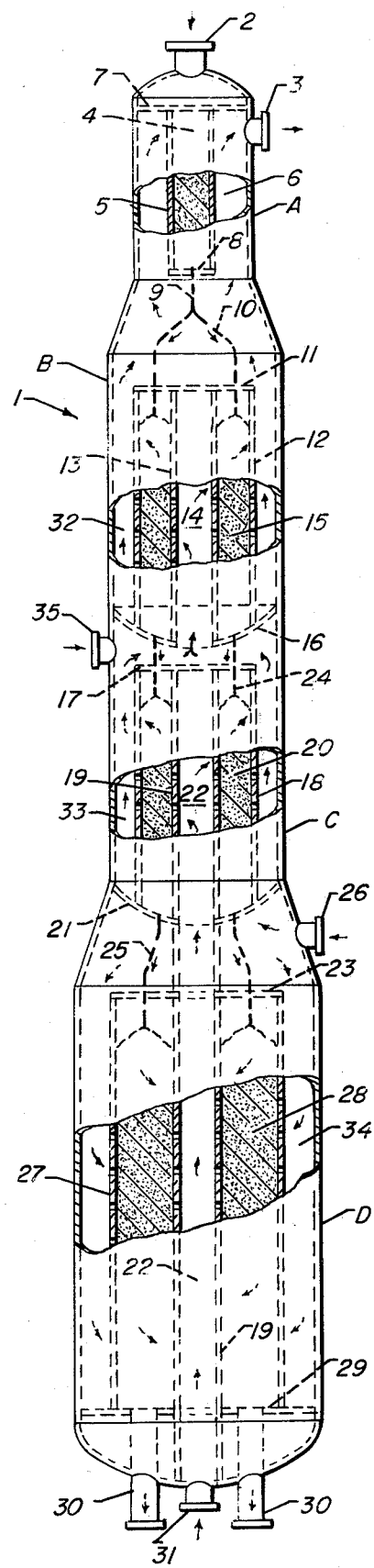
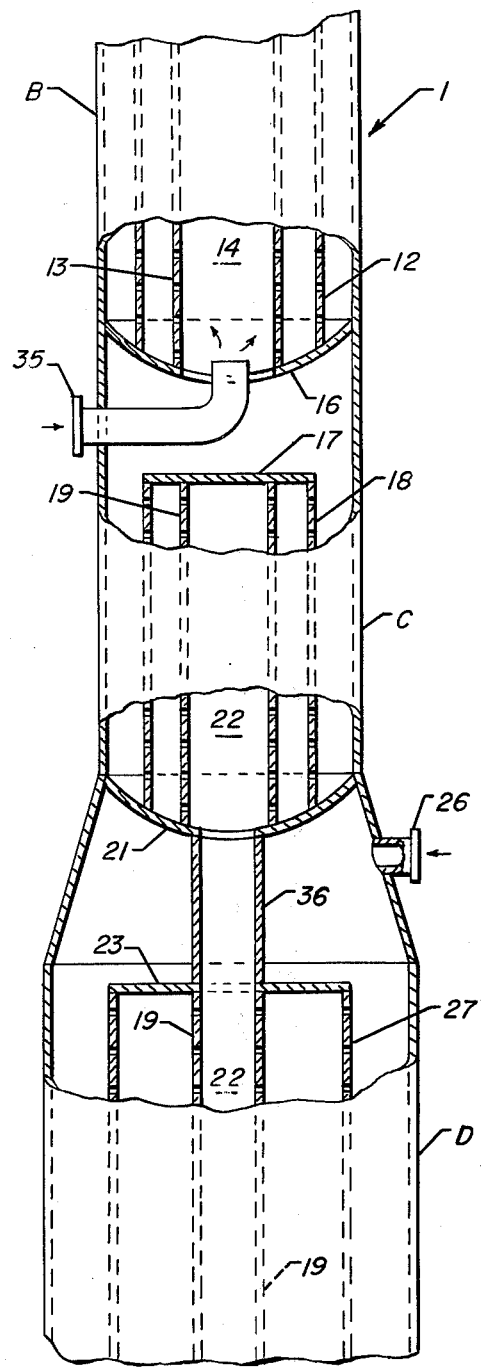

APPARATUS FOR COUNTERCURRENT CATALYTIC CONTACT OF A REACTANT STREAM IN A MULTIPLE-STAGE PROCESS

APPLICABILITY OF INVENTION

The present invention is directed toward an improved means and method for effecting the multiple-stage, countercurrent catalytic contact of a reactant stream and, more particularly, to a process and system wherein the catalyst particles are movable via gravity-flow. Applicable to both exothermic and endothermic reaction systems, our invention also provides for the introduction of a heat-exchange fluid stream into an intermediate mixing zone between two of the catalytic stages, or reaction zones.

Various types of multiple-stage reaction systems have experienced widespread utilization throughout the petroleum and petrochemical industries for effecting multitudinous reactions, and especially hydrocarbon conversion reactions. Such reactions are either principally exothermic, or endothermic, and include both hydrogen-producing and hydrogen-consuming reactions. Similarly, a wide spectrum of designs and arrangements have been proposed to effect the countercurrent conversion of the charge stock and for the purpose of introducing heating or cooling media into the reaction chamber at intermediate loci between the catalytic stages.

Multiple-stage reaction systems are generally of two types: (1) side-by-side configuration, with intermediate heating and/or cooling between zones, wherein the reactant stream or mixture flows serially from zone to zone; and, (2) a stacked design wherein a single reaction chamber contains the multiple contact stages. Such systems, as applied to petroleum refining, have been employed to effect numerous hydrocarbon conversion reactions including those which are prevalent in catalytic reforming, fixed-bed alkylation, ethylbenzene dehydrogenation to produce styrene, other dehydrogenation processes, hydrorefining, isomerization, desulfurization, hydrocracking, hydrogenation, transalkylation, steam reforming for substitute natural gas (SNG) production, etc. It will be immediately recognized that some of these processes are exothermic — e.g. hydrocracking — some are endothermic — e.g. ethylbenzene dehydrogenation — and some encompass both — e.g. catalytic reforming. It should be noted that these reactions are effected in vapor-phase, liquid-phase or mixed-phase, depending principally upon the charge stock characteristics and the ultimately desired product slate.

Traditionally, hydrocarbon conversion processes have been effected catalytically in a fixed-bed system, either in downward flow, upward flow, or in a lateral/radial flow wherein the catalyst is disposed as an annular-form bed. Many design and operating considerations indicate the advantages of annular-form, radial flow, particularly in a vapor-phase operation. Illustrative of a reaction system, wherein the reactant feed stream is caused to flow laterally and radially through the catalyst, is that described in U.S. Pat. No. 2,683,654 (Cl. 23–288). The type of reactor shown is intended for the common fixed-bed system, either single-stage, or multiple-stage in a side-by-side relationship. The reactant stream flows from an outer annular-form space through a catalyst-retaining screen and catalyst particles disposed in another annular-form space, and into a perforated centerpipe, through the bottom of which it emanates from the reaction chamber.

U.S. Pat. No. 3,470,090 (Cl. 208–138) illustrates a side-by-side reaction system having intermediate heating of the reactant feed stream. This constitutes an example of a system in which the catalyst particles are movable via gravity-flow. Catalyst which is withdrawn from an individual reaction zone is sent to suitable off-site regeneration facilities. This particular reaction zone arrangement can be modified to the extent that that catalyst withdrawn from a given reaction zone is transported to the next succeeding reaction zone, while that catalyst withdrawn from the last reaction zone is transported to suitable on-site regeneration facilities. Of more recent vintage is the "stacked" configuration as shown in U.S. Pat. No. 3,647,680 (Cl. 208–65); this is a two-stage system with and integrated regeneration facility which receives the catalyst withdrawn from the bottom reaction chamber. The latter two techniques make use of a downwardly-moving bed of catalyst particles through which the reactant stream flows laterally and radially.

It must be noted that none of these recognize countercurrent hydrocarbon processing, and certainly not in combination with a reaction system in which the catalyst particles are movable via gravity-flow. It is acknowledged that some processes have been considered for countercurrent flow of the reactant stream; that is, flowing the feed stream upwardly through a fixed-bed of catalyst particles. However, there is no awareness of combining countercurrent flow of the reactant stream with a downwardly-moving bed of catalyst particles.

As hereinbefore stated, the present inventive concept is directed toward a multiple-stage reaction system for countercurrently contacting a fluid reactant stream with catalyst particles which are movable through the entire system via gravity-flow. Although applicable to all the foregoing reactor configurations, processes and reactions, the multiple-stage reaction system herein described is most readily adaptable for use in effecting those hydrocarbon conversion reactions wherein the rate and degree of catalyst deactivation increases in the direction of reactant stream flow.

OBJECTS AND EMBODIMENTS

One object of our invention is to provide a multiple-stage reaction system for countercurrently contacting a fluid reactant stream with catalyst particles movable through the system by way of gravity-flow. A corollary objective resides in affording a reaction system for effecting the countercurrent, vapor-phase contact of a reactant feed stream with catalyst particles disposed as annular-beds, and in which they are movable via gravity-flow.

A more specific object is to afford a technique for effecting those hydrocarbon conversion reactions in which the rate and degree of catalyst deactivation increases in the direction of reactant stream flow.

Therefore, in one embodiment, our inventive concept encompasses a unitary, multiple-stage reaction system for countercurrently contacting a fluid reactant stream with catalyst particles movable through said system via gravity-flow, which system comprises, in combination: (a) a tubular-form, vertically-disposed reaction chamber; (b) at least two reaction zones within said chamber, each of said zones having coaxially-disposed, inner and outer tubular-form, catalyst-retaining screens forming (i) an annular-form catalyst-holding section therebetween, (ii) an annular-form void volume between the outer screen and the interior wall of said chamber, and, (iii) a center reactant conduit; (c) in the lowermost of said reaction zones, (i) a first lower, imperforate transverse partition connected to said inner and outer catalyst-retaining screens, and to the interior wall of said chamber, said first lower partition terminating at said inner retaining screen, and (ii) a first upper imperforate transverse partition connected to said inner and outer catalyst-retaining screens, and terminating at both the inner and outer screens; (d) at least one other of said reaction zones, vertically-disposed above said lowermost reaction zone, having (i) a second lower, imperforate transverse partition, connected to said inner and outer retaining screens, and to the interior wall of said chamber, terminating at said inner retaining screen, and, (ii) a second upper, imperforate transverse partition connected to said inner and outer retaining screens, and terminating at said outer screen; (e) catalyst-transfer conduits connecting a catalyst-holding section with the next succeeding lower catalyst-holding section, and catalyst-withdrawal conduits extending downwardly through a lower extremity of said chamber, whereby catalyst particles flow via gravity from one catalyst-holding section to a lower catalyst-holding section, and out of said chamber; (f) a first fluid reactant inlet port in said lowermost reaction zone at a locus between said first upper and said second lower imperforate transverse partitions; (g) a second fluid reactant inlet port in the bottom of said reaction chamber, in open communication with said center reactant conduit; (h) a reaction product outlet port in the upper end of said chamber, in open communication with the uppermost annular-form void volume; and (i) a catalyst inlet port in the upper end of said chamber, in open communication, via catalyst-transfer conduits, with the uppermost catalyst-holding section; said reaction system being further characterized in that said inner catalyst-retaining screen is imperforate along that portion of its length extending from said first upper, imperforate transverse partition to said second lower imperforate transverse partition.

In another embodiment, the reaction chamber contains three reaction zones, the third, uppermost one of which has disposed therein inner and outer tubular-form, catalyst-retaining screens forming (i) an annular-form catalyst-holding section therebetween, (ii) an annular-form void volume between the outer screen and the interior wall of said chamber, and (iii) a center reactant conduit. In still another embodiment, the three reaction zone system is further characterized in that the inner catalyst-retaining screen is continuous through the lower two reaction zones, and terminates at its upper end at said second upper, imperforate transverse partition.

The multiple-stage reaction system is advantageously utilized in a process for effecting the counter-current contact and conversion of a reactant stream with catalyst particles movable through said stages via gravity-flow, which process comprises the steps of: (a) introducing a first portion of said reactant stream into a reaction chamber, containing at least two vertically-disposed reaction zones, at a locus intermediate said reaction zones; (b) passing said first portion downwardly through the lower of said reaction zones, and flowing said portion laterally, in radial flow, through a first annular-form catalyst bed, in which the catalyst particles are movable via gravity-flow, into a center reactant conduit; (c) introducing a second portion of said reactant stream into the lower extremity of said center reactant conduit, within said lower reaction zone; (d) introducing the resulting mixture of said second reactant stream portion and the reaction product of said first reactant stream portion into a center reactant conduit within the uppermost of said reaction zones; (e) passing said mixture upwardly through said upper reaction zone and flowing said mixture laterally, in radial flow, through a second annular-form catalyst bed, in which the catalyst particles are movable via gravity-flow, into an outer annular-form void volume; and, (f) withdrawing the resulting converted reactant stream from an upper portion of said second annular-form catalyst bed.

In a preferred embodiment, the above-described process is further characterized in that the reaction chamber contains three annular-form, movable catalyst beds and (1) a heat-exchange fluid medium is introduced at a locus between the upper two of said catalyst beds, and (2) the resulting mixture of said fluid medium and the converted reactant stream from the next lower annular-form catalyst bed flows upwardly into a second reactant conduit and laterally, in radial flow, through an annular-form third catalyst bed.

Other objects and embodiments will become evident from the following, more detailed description of our inventive concept, and the reaction system and process encompassed thereby.

SUMMARY OF INVENTION

As hereinabove set forth, our invention is particularly directed toward the multiple-stage contact and conversion of a fluid reactant stream in countercurrent flow with respect to catalyst particles which are movable through the various stages by way of gravity-flow. Counter-current processing of a reactant stream has heretofore given rise to a host of difficulties and attendant problems. These primarily stem from the fact that the linear velocity of reactant or effluent vapors increases as they pass upwardly through the catalyst zone. As the linear velocity increases, fluidization of a packed catalyst bed can occur to the extent of destroying the optimum catalyst/reactant contact, and thus induce catalyst breakage as a result of constant contact with internal equipment. In many processes, especially those which are significantly exothermic, or endothermic, these difficulties are compounded by virtue of the necessity to utilize intermediate heat-exchange fluids. Typical of such processes are hydrocracking, especially for liquefied petroleum gas (LPG) production, steam reforming to produce substitute natural gas (SNG) and ethylbenzene dehydrogenation to produce styrene, etc.

The above-mentioned processes, in addition to others, appear to have a common characteristic with respect to deactivation of the catalyst particles. This appears not to be dependent upon either upflow, or downflow contact of the catalyst with the reactant stream. In either situation, that segment of the catalyst which "sees" the reactant stream first, will deactivate first and at a significantly more rapid rate than the remaining portion of catalyst. As the zone of deactivated catalyst proceeds through the entire catalyst bed, less becomes available for effecting the desired reactions.

Ultimately, of course, the entire catalyst bed becomes deactivated and the unit must be shut down for regeneration or catalyst replacement. When utilizing a reaction system in which the catalyst particles are movable, via gravity-flow, from reaction stage to reaction stage, ultimtely being withdrawn from the system, in combination with countercurrent flow of the reactant stream, it is possible to remove that catalyst which is deactivated first, while simultaneously introducing fresh catalyst into the uppermost stage. The withdrawn catalyst can either be transported to on-site regeneration facilities, or discarded for metals recovery. The latter is dependent principally upon the cause of deactivation, and whether techniques exist to regenerate the catalyst employed. For example, hydro-cracking for LPG production generally utilizes a catalyst of a Group VIII and/or Group VI-B metal combined with a refractory inorganic oxide carrier material — e.g. alumina-silica. Deactivation of this catalyst generally stems from coke deposition, and regeneration thereof is readily possible. On the other hand, a steam reforming catalyst — i.e. nickel on silica/alumina with modifiers such as magnesium oxide and/or copper-chromium complexes — deactivates as a result of the crystallite growth of the active metal, and is not readily subject to regeneration. In either situation, the utilization of our invention prolongs the continuous on-stream time afforded between shut-downs either for catalyst regeneration, or the replacement thereof.

An additional advantage resides in a significant decrease in the required catalyst inventory within the reaction chambers, especially with respect to catalyst which is not regenerable and must be replaced. Situations of this nature are perhaps best exemplified by considering a multiple-stage steam reforming process for SNG production. Briefly, this process is generally effected in two or more stages of gasification, with split feed, followed by one or more stages of shift methanation to increase the methane concentration. Considering only the gasification stages, a typical two-stage unit designed to process about 30,000 Bbl/day of a naphtha feed, requires about 382,000 pounds of catalyst (total in both stages) to function for about one and one-half years prior to a shut-down for catalyst replacement. The catalyst inventory in a unit of this capacity can be decreased by as much as 20–60 percent through the use of the present inventive concept, without the need for a shut-down except for the normal, periodic turn-arounds for maintenance purposes.

The multiple-stage reaction system herein described utilizes tubular-form components which may take any suitable shapes such as triangular, square, oblong, diamond, etc. Many design, fabrication and technical considerations dictate the advantages of using components which are substantially circular in cross-section. While these will be evident to those possessing the requisite skill in catalytic processing, mention of the most important consideration is warranted; that is, uniformity of catalyst flow throughout the system, while countercurrently flowing the reactant stream laterally and radially therethrough.

The basic component of the reaction system is a vertically-disposed reaction chamber containing at least two separate, individual reaction zones. In a preferred embodiment, the chamber contains three reaction zones as hereinafter described in conjunction with the accompanying drawings. These reaction zones are formed by coaxially disposed inner and outer catalyst-retaining screens. These screens form an annular catalyst-holding section therebetween and an annular-form void volume with respect to the interior wall of the entire reaction chamber. The inner catalyst-retaining screen provides a center reactant conduit into the lower portion of which fresh reactant stream, or reactant stream effluent from a lower reaction zone is introduced. Although the utilization of inner and outer catalyst-retaining screen members is preferred in forming the annular-form, catalyst-holding sections, the annular-form void volume and the center reactant conduit, these same essential elements can be formed through the utilization of perforated cylinders. The primary consideration is that the openings either in the screen members, or in the perforated cylindrical members, be sized to prevent the migration of catalyst particles into the outer annular-form void volume, or into the center reactant conduit.

The reaction zones are spaced apart through the use of lower and upper imperforate transverse partitions. In this regard, the following discussion will be directed toward a reaction chamber having three individual reaction zones as illustrated in the accompanying drawings. With respect to the lowermost of the three reaction zones, the lower, imperforate transverse partition extends to, and is connected with the interior wall of the reaction chamber, and to both the inner and outer catalyst-retaining screens; however, this lower imperforate transverse partition terminates at the inner catalyst-retaining screen such that the center reactant conduit is in open communication, at its lower extremity, with a fluid reactant stream inlet conduit. The upper imperforate transverse partition, within the lowermost reaction zone, is connected to both the inner and outer catalyst-retaining screen members, but terminates at the outer screen in order that the annular-form void volume between the outer screen and interior wall of the chamber is in open communication with another fluid reactant stream inlet conduit. This upper imperforate transverse partition also terminates at the inner catalyst-retaining screen so that the center reactant conduit of the lowermost reaction zone is in open communication, or contiguous, with the center reactant conduit of the next uppermost reaction zone. The lower, imperforate transverse partition, disposed within the middle reaction zone, is simlar to that disposed within the lowermost reaction zone; that is, it terminates at the inner catalyst-retaining screen, is attached to the outer catalyst-retaining screen and terminates at the interior wall of the chamber. That portion of the inner catalyst-retaining screen which extends from the first upper, imperforate transverse partition to the second lower, imperforate transverse partition is also imperforate.

In this manner, a first portion of the reactant stream is introduced into the reaction chamber at a locus intermediate the middle and lowermost reaction zones. The locus is situated such that it is intermediate the second lower, imperforate transverse partition and the first upper, imperforate transverse partition. As the reactant stream enters the reaction chamber, it is caused to flow downwardly through the lower annular-form void volume and laterally, in radial flow, through the annular-form catalyst bed, disposed between the inner and outer catalyst-retaining screens, into the center reactant conduit. A second portion of the reactant stream is introduced into the lowermost extremity of the center reactant conduit, to be admixed therein with the reactant product effluent from the lowermost reaction zone, the mixture continuing upwardly into the middle reaction zone.

The upper, imperforate transverse partition within the second, or middle reaction zone, is connected to both the inner and outer catalyst-retaining screens, but terminates at the outer screen. In this manner, the reactant stream flowing upwardly through the center reactant conduit flows laterally, in radial fashion, in an inward-to-outward direction into the annular-form void volume. The lower, imperforate transverse partition within the uppermost reaction zone is identical to the lower, imperforate transverse partition disposed within the lowermost reaction zone. That is, it is connected to the interior wall of the chamber and both the inner and outer catalyst-retaining screens, but terminates at the inner screen such that the reactant stream effluent from the middle reaction zone is caused to flow upwardly through the center reactant conduit and laterally, in radial flow, through the uppermost annular-form catalyst bed into the annular-form void volume. The upper, imperforate transverse partition within the uppermost reaction zone is virtually identical with that disposed within the middle reaction zone. In a preferred embodiment, a heat-exchange fluid medium is introduced at a locus intermediate the second upper, imperforate transverse partition and the third lower, imperforate transverse partition.

In a preferred method of operation, the heat-exchange fluid inlet conduit discharges upwardly into the center reactant conduit. The precise character of the heat-exchange fluid is primarily dependent upon the process being effected, as well as whether the principal character of the reactions is exothermic, or endothermic. In the situation involving the hydrocracking of a normally liquid feedstock for LPG product, being a highly exothermic reaction, the heat-exchange fluid may be hydrogen, a hydrocarbon stream such as unconverted feedstock which is being recycled, a portion of the desired product effluent, etc. Similarly, the steam reforming of hydrocarbons to produce a methane-rich, substitute natural gas, is a highly exothermic reaction. Experience dictates that the heat-exchange fluid effects a decrease in the temperature of the reaction stream effluent from the lower reaction zone; therefore, the heat-exchange fluid may consist of a portion of fresh feed charge stock in admixture with steam, a portion of the fresh feed charge stock itself, or a portion of the methane-rich product effluent. An example of an endothermic reaction system is the dehydrogenation of ethylbenzene to produce styrene. This entails the introduction of high temperature steam as the heat-exchange fluid medium in order to reheat the reactant stream for processing in the succeeding upper reaction zone.

For the sole purpose of illustration, and not with the intent of unduly limiting the present invention beyond the scope and spirit of the appended claims, it will be presumed that the various tubular-form components are substantially circular in cross-section and further that the reaction system is being utilized in a steam reforming process for the production of methane-rich SNG.

Steam reforming is generally effected with a steam to carbon ratio in the range of about 1.1 to about 6.0, and preferably from about 1.3 to about 4.0. The mixture is passed into a steam reforming reaction zone (generally multiple-stage) at a temperature such that the maximum catalyst bed temperature is in the range of about 800°F. to about 1100°F., and preferably from about 825°F. to about 1000°F. Steam reforming reactions are effected under an imposed pressure in the range of about 250 psig. to about 1500 psig., and preferably from about 400 psig. to about 1000 psig.

A wide variety of steam reforming catalytic composites are well known, and have been thoroughly described in the appropriate literature. In general, these catalysts utilize metallic components selected from Group VI-B and the iron-group of the Periodic Table. Also disclosed are the benefits to be accrued through the utilization of catalytic promoters selected from alkali and alkaline-earth metals. These catalytic components are generally combined with a suitable refractory inorganic oxide carrier material, either synthetically-prepared or naturally-occurring. One particularly suitable steam reforming catalyst is that described in U.S. Pat. No. 3,429,680 (Class 48-214), which catalyst utilizes a carrier material of kieselguhr and a catalytically active nickel component promoted by a copper-chromium, or copper-chromium-manganese complex, and which may, or may not be further promoted by the addition of an alkaline-earth metal oxide.

The reaction zone product effluent, principally comprising methane, carbon monoxide, carbon dioxide, hydrogen and steam is cooled to a temperature in the range of about 400° to about 800°F., preferably with an upper limit of about 650°F. The cooled effluent is then introduced into one or more shift methanation zones wherein the hydrogen and carbon monoxide are converted into additional methane. Following the removal of water and carbon dioxide, the resulting SNG has a heating value of from about 950 to about 1,000 BTU per cubic foot. It is to this type of hydrocarbon processing that the present invention is particularly applicable; however, it is understood that there is no intent to so limit the scope of the appended claims.

DESCRIPTION OF DRAWINGS

In further describing our invention, reference will be made to the accompanying drawings which are presented to illustrate several embodiments. It will be presumed that the various components are substantially circular in cross-section, and, for the sake of simplicity and brevity, that the reaction system is being utilized in a steam reforming process for the production of methane-rich, substitute natural gas. It is understood that the drawings are presented for the sole purpose of illustration, and are not to be construed as limiting our invention beyond the scope and spirt of the appended claims.

Briefly, FIG. 1 illustrates a "stacked" reaction chamber 1, having three annular-form catalytic reaction zones B, C, and D. As hereinafter described in greater detail, the upper portion of the reaction chamber constitutes a catalyst-treating zone A.

FIG. 2 is an enlarged, sectioned elevation showing the lower portion of reaction zone B, the center reaction zone C and the upper portion of reaction zone D. Catalyst particles and catalyst transfer conduits have been eliminated from the illustration in FIG. 2 as being non-essential to an understanding of the arrangement of the various components of the entire reaction system.

Further description of the reaction system encompassed by the present inventive concept will be made in conjunction with a commercially-scaled unit designed to process approximately 33,000 barrels per day of a naphtha boiling range charge stock having a gravity of about 68.8 °API and an average molecular weight of 103.4. Analyses indicate that the naptha charge stock consists of about 88.2% by volume of paraffins, 8.2% naphthenes and about 3.5% aromatics, and has the approximate component analysis indicated in the following Table I:

TABLE I

Charge Stock Analysis

| Component | Mols/Hour |
| --- | --- |
| N-Butane | 14.30 |
| Isopentane | 100.47 |
| N-Pentane | 152.25 |
| Hexanes-Plus | 2,932.59 |
| Total | 3,199.61* |

*Equivalent to 32,191 Bbl./day

This particular process involves two gasification reaction zones, employing split feed; that is, approximately one-half of the charge stock is introduced into the first gasification zone, the reactant stream effluent from which is admixed with the second half of the charge stock prior to the introduction thereof into the second reaction zone. Furthermore, the unit utilizes a methanation reaction zone in order to reduce the concentration of hydrogen and carbon monoxide in the product effluent, while increasing the heating value of the ultimately desired product.

Specific reference now to FIG. 1, reaction chamber 1 is illustrated as consisting of a catalyst-treating section A, an upper methanation reaction zone B, an intermediate gasification reaction zone C and a lower gasification reaction zone D. The catalytic composite, utilized in both the gasification reaction reaction zones as well as in the methanation reaction zone, comprises, on a weight percent basis, 8.0 silica, 45.0 nickel, 14.0 magnesium, 1.56 copper, 1.17 chromium and 0.14 manganese, the remainder being oxygen. This particular catalytic composite does not readily lend itself to an oxidative regeneration technique in view of the fact that carbon deposition does not appear to be the primary cause of catalyst deactivation. Furthermore, in the process of steam reforming, utilizing the above-described, nickel-containing catalyst, it is essential that the hot reactant stream does not contact "cold" catalyst particles. Should such contact take place, water will condense on the catalyst particles, thereby effecting a reaction between the nickel and carbon oxides to form nickel carbonyl. This, in turn, decomposes at elevated temperatures with the result that the crystallite size of the nickel component increases and catalyst activity is severely, detrimentally effected. Therefore, catalyst-treating section A will function primarily as a heat-exchange zone to raise the temperature of the catalyst particles prior to the contact thereof in methanation reaction zone B.

Upper catalyst-treating section A contains a catalyst-holding zone 4 formed by cylindrical member 5 and having a nominal cross-sectional area less than that of the treating section, thereby providing annular space 6 between the exterior of the catalyst-holding zone and the interior of the catalyst-treating section. Depending upon the particular treatment accorded to the catalyst within the catalyst-holding zone, for example, oxidation, reduction, sulfiding, heating, etc., cylindrical member 5 will either be imperforate, or perforated to permit the reactant effluent vapors to pass through the catalyst particles therein. In the present situation, as hereinbefore stated, the catalyst particles must be heated to avoid the detrimental formation of nickel carbonyl. Therefore, cylindrical member 5 will be substantially imperforate, and catalyst-treating section A will serve to accomplish indirect heat-exchange. Catalyst-holding zone 4, confined within cylindrical member 5, is further defined by an upper imperforate plate 7 which extends to the interior wall of the catalyst-holding section, and imperforate plate 8 which terminates at cylindrical member 5 to provide an outer annular-form void volume 6 through which reactant effluent vapors pass.

Fresh catalyst particles, or in many instances regenerated catalyst particles, are introduced into the uppermost portion of reaction chamber 1 by way of catalyst-inlet port 2. These catalyst particles are introduced thereby into catalyst-holding zone 4, wherein the temperature thereof is increased by way of indirect heat-exchange with the reactant effluent vapors in annular-form void volume 6. Although the dimensions of catalyst-treating section A are dependent upon a wide variety of factors, including the treatment to be accorded the catalyst particles, a primary consideration is the average rate of catalyst withdrawal from the reaction chamber. In the present illustration, the average catalyst withdrawal rate approximates 20 pounds per hour, and the catalyst-holding zone is designed to provide a residence time of approximately 2 hours.

The thus-treated catalyst particles are withdrawn from catalyst-holding zone 4 by way of a principal catalyst-transfer conduit 9. This main conduit feeds into a plurality of secondary catalyst-transfer conduits 10 generally numbering from about 6 to about 16, and uniformly spaced throughout the cross-sectional area of the upper portion of the annular-form catalyst bed in reaction zone B.

Similarly, catalyst particles are withdrawn, by way of gravity-flow, from catalyst bed 15 by way of a plurality of catalyst-transfer conduits 24, again numbering from about 6 to about 16 and uniformly spaced throughout the cross-sectional area of the catalyst bed. These catalyst particles are introduced into annular-form catalyst bed 20 disposed in reaction zone C. Catalyst-transfer conduits 25 are utilized to withdraw catalyst particles from catalyst bed 20, and introduce the same into annular-form catalyst bed 28 disposed in the lowermost reaction zone D. Deactivated catalyst particles are withdrawn, by way of a plurality of catalyst-withdrawal conduits 30, from the lowermost portion of reaction zone D. In many processes, as hereinbefore set forth, the main cause of catalyst deactivation is the deposition of coke and other carbonaceous materials. Therefore, the deactivated catalyst particles withdrawn by way of catalyst-withdrawal conduits 30 may be transported to an on-stream catalyst-regeneration facility which also functions with a gravity-flowing catalyst bed. In the present illustration, since the catalyst particles are not readily susceptible to oxidative regeneration, they will be transported to a suitable metal-recovery system.

Approximately one-half of the fresh naphtha charge stock, hereinbefore described, (1,585.98 moles per hour) is admixed with steam in the amount of 23,169.16 moles per hour. This mixture constitutes the "fresh feed" to reaction zone D by way of inlet port 26. The temperature of the feed to reaction zone D is about 900°F., the hydrogen/naphtha mole ratio is about 0.3, the steam/carbon ratio is about 2.0 and the pressure is about 600 psig.

Reaction zone D has disposed therein coaxially-disposed, inner and outer tubular-form, catalyst-retaining screens 19 and 27, respectively. Both the inner and outer retaining screens are perforated substantially along the entire length, and form therebetween an annular-form catalyst bed 28. The nominal diameters of the catalyst-retaining screens are such that outer retaining screen 27 forms an annular-form void volume 34 with the interior wall of reaction zone D, and inner screen 19 provides a centrally located reactant conduit 22. Reaction zone D is defined, at its lowermost extremity, by a substantially imperforate transverse partition 29. The use of the term "substantially imperforate" is intended to connote that the transverse partition is provided with appropriate openings which permit catalyst particles to be withdrawn by way of catalyst-withdrawal conduits 30. Transverse partition 29 is connected to the interior wall of reaction zone D, to inner catalyst-retaining screen 19 and to outer catalyst-retaining screen 27. However, the transverse partition terminates at inner retaining screen 19 in order to provide an unrestricted passageway into center reactant conduit 22. Catalyst bed 28 is also defined by an upper imperforate transverse partition 23 connected to both the inner and outer catalyst-retaining screens 19 and 27. As indicated in FIG. 1, transverse partition 23 terminates at both the inner and outer catalyst-retaining screens. It should be noted that the portion of inner catalyst-retaining screen 19 extending from upper imperforate transverse partition 23 to lower imperforate transverse partition 21, is imperforate. Therefore, the portion of the fresh feed charge stock being introduced via port 26 initially flows downwardly through annular-form void volume 34, laterally and radially through catalyst bed 28 into center reactant conduit 22 and upwards into reaction zone C.

The second portion of the charge stock is introduced into the lowermost portion of reaction zone D by way of conduit 31, and is admixed with the reactant product effluent in center reactant conduit 22. Component analyses of the charge stock entering conduit 26 and the reaction product effluent from reaction zone D are given in the following Table II:

TABLE II

| Reaction Zone "D" Component Analyses | | |
|---|---|---|
| Component | Feed* | Effluent* |
| Steam | 23169.16 | 16873.22 |
| Carbon Monoxide | — | 107.04 |
| Carbon Dioxide | — | 2915.92 |
| Hydrogen | 475.75 | 2493.71 |
| Methane | 52.84 | 8056.39 |
| N-Butane | 7.09 | — |
| Isopentane | 49.80 | — |
| N-Pentane | 75.47 | — |
| Hexanes-plus | 1453.62 | — |

*Values in Mols/Hour

The component analyses presented in Table II are exclusive of the fresh feed charge stock and inclusive of 653.43 moles/hour of steam being introduced by way of inlet conduit 31. The outward to inward flow in reaction zone D has the effect of causing the fresh feed charge stock to see a greater quantity of catalyst in a shorter period of time than would be the situation if the reactant stream flow were reversed. An additional advantage resides in the fact that catalyst bed 28 functions as a trash catcher, and is that catalyst which is withdrawn from the reaction chamber.

Reaction zone C is defined by a lower imperforate transverse partition 21 which is connected to both the inner and outer catalyst-retaining screens, 18 and 19, and to the interior wall of the reaction chamber. An upper imperforate transverse partition 17 is connected only to the inner and outer catalyst retaining screens, and terminates at the outer screen 18. Center reactant conduit 22 is continuous through both reaction zone D and reaction zone C and terminates at upper transverse partition 17. Therefore, the material in that portion of center reactant conduit 22 flows laterally and radially through catalyst bed 20 into outer void volume 33. Component analyses of the total feed to reaction zone C and the effluent therefrom are presented in the following Table III:

TABLE III

| Reaction Zone "C" Component Analyses | | |
|---|---|---|
| Component | Feed* | Effluent* |
| Steam | 16873.22 | 11591.56 |
| Carbon Monoxide | 107.04 | 321.11 |
| Carbon Dioxide | 2915.92 | 5449.76 |
| Hydrogen | 2493.71 | 2690.31 |
| Methane | 8056.39 | 17041.24 |
| N-Butane | 7.21 | — |
| Isopentane | 50.67 | — |
| N-Pentane | 76.78 | — |
| Hexane-plus | 1478.97 | — |

*Values in Mols/Hour

In order to decrease the concentration of hydrogen in the product effluent from reaction zone C, the temperature is decreased to a level of about 550°F. by introducing a sufficient portion of the ultimate SNG product by way of inlet port 35. At the lower temperature, the hydrogen is caused to react with carbon dioxide and carbon monoxide to produce additional methane and water. The mixture flows into reaction zone B in center reactant conduit 14 and laterally and radially through catalyst bed 15 defined by inner retaining screen 13 and outer retaining screen 12. The product effluent from the shift methanation zone flows through outer void volume 32 into catalyst-treating section A.

Reaction zone B is defined by a lower imperforate transverse partition 16 and an upper transverse partition 11. The lower transverse partition is connected to the interior wall of the reaction chamber and to both catalyst-retaining screens 12 and 13. However, it terminates at inner catalyst-retaining screen 13. Upper transverse partition 11 is connected to both the inner and outer catalyst-retaining screens and terminates at outer retaining screen 12 in order to provide uninhibited flow in outer void volume 32.

The product effluent from reaction zone B is utilized to heat the catalyst particles in catalyst-treating zone A. The product effluent from the shift methanation reaction zone is withdrawn by way of port 13. A component analysis thereof is presented in the following Table IV:

TABLE IV

| Shift Methanation Effluent Analysis | |
|---|---|
| Component | Mols/Hour |
| Steam | 12692.33 |
| Carbon Monoxide | 0.56 |
| Carbon Dioxide | 5059.61 |
| Hydrogen | 168.13 |
| Methane | 17751.92 |

The product effluent from line 3 is introduced into a condenser and a suitable separator from which condensed water is removed. The substantially water-free product gas is then subjected to treatment for the removal of carbon dioxide. Carbon dioxide removal may be effected in any manner well known in the prior art. One such conventional system involves monoethanolamine adsorption. Another adsorption scheme utilizes hot potassium carbonate, while another suitable technique employs a catalytic reaction system utilizing vanadium pentoxide as the catalyst.

FIG. 2 is a sectioned view of a portion of the reaction chamber, and illustrates several preferred embodiments with respect to the internal configuration of the various reaction zone elements. It should be noted that catalyst-retaining screen 19 is imperforate along that portion 36 which extends from upper transverse partition 23 to lower transverse partition 21. Thus, the feed stock being introduced via inlet conduit 26 is caused to flow downwardly into the outer annular void volume, through retaining screens 27 and 19, and into the center reactant conduit 22. Conversely, reaction zone C is defined by transverse partitions 21 and 17 to effect inward to outward radial flow.

The cross-sectional area of that portion of center reactant conduit 22 within reaction zone C is greater than that portion within reaction zone D. Likewise, the cross-sectional area of center reactant conduit 14 is greater than that of conduit 22 within reaction zone C. This particular embodiment is preferred when consideration is given to the combined velocity head, the pressure drop across the annular-form catalyst beds, the critical path velocity and avoidance of channeling and fluidization of the catalyst. The heat-exchange medium conduit 35 preferably discharges upwardly into center reactant conduit 14 in order to enhance the mixing thereof with the vaporous effluent from reaction zone C.

The methane-rich, substitute natural gas, following water and carbon dioxide removal has a heating value of about 985 BTU per cubic foot. Catalyst inventory is reduced about 30.0%, and the system functions continuously for a period of about 2½ years without being shut down except for routine maintenance purposes.

We claim as our invention:

1. A unitary, multiple-stage reaction system for countercurrently contacting a fluid reactant stream with catalyst particles movable through said system via gravity-flow, which system comprises, in combination:
   a. a tubular-form, vertically-disposed reaction chamber;
   b. at least two reaction zones within said chamber, each of said zones having coaxially-disposed, inner and outer tubular-form, catalyst-retaining screens forming (i) an annular-form catalyst-holding section therebetween, (ii) an annular-form void volume between the outer screen and the interior wall of said chamber and, (iii) a center reactant conduit;
   c. in the lowermost of said reaction zones, (i) a first lower, imperforate transverse partition connected to said inner and outer catalyst-retaining screens, and to the interior wall of said chamber, said first lower partition terminating at said inner retaining screen, and (ii) a first, upper imperforate transverse partition connected to said inner and outer catalyst-retaining screens, and terminating at both the inner and outer screens;
   d. at least one other of said reaction zones, vertically-disposed above said lowermost reaction zone, having (i) a second lower, imperforate transverse partition, connected to said inner and outer retaining screens, and to the interior wall of said chamber, terminating at said inner retaining screen, and, (ii) a second upper, imperforate transverse partition connected to said inner and outer retaining screens, and terminating at said outer screen;
   e. catalyst-transfer conduits connecting a catalyst-holding section with the next succeeding lower catalyst-holding section, and catalyst-withdrawal conduits extending downwardly through the lower extremity of said chamber, whereby catalyst particles flow via gravity from one catalyst-holding section to a lower catalyst-holding section, and out of said chamber;
   f. a first fluid reactant inlet port in said lowermost reaction zone at a locus between said first upper and said second lower imperforate transverse partitions, whereby a reactant stream passing through said first fluid reactant inlet port will pass downward through said annular-form void in said lowermost reactant section and laterally through said lowermost catalyst retaining section to said center reactant conduit;
   g. a second fluid reactant inlet port in the bottom of said reaction chamber, in open communication with said center reactant conduit;
   h. a reaction product outlet port in the upper end of said chamber, in open communication with the uppermost annular-form void volume; and,
   i. a catalyst inlet port in the upper end of said chamber, in open communication, via catalyst-transfer conduits, with the uppermost catalyst-holding section;

said reaction system being further characterized in that said inner catalyst-retaining screen in said lowermost reaction zone extends from said first lower, imperforate transverse partition to said second lower, imperforate transverse partition and is imperforate along that portion of its length extending from said first upper, imperforate transverse partition to said second lower imperforate transverse partition.

2. The reaction system of claim 1 further characterized in that said chamber contains three reaction zones, the third, uppermost one of which having inner and outer tubular-form, catalyst-retaining screens forming (i) an annular-form catalyst-holding section therebetween, (ii) an annular-form void volume between the outer screen and the interior wall of said chamber, and, (iii) a center reactant conduit.

3. The reaction system of claim 2 further characterized in that the nominal diameter of the portion of said inner catalyst-retaining screen with said lower reaction zone is less than that within the upper of said two reaction zones.

4. The reaction system of claim 2 further characterized in that the nominal diameter of the inner catalyst-retaining screen within the third, uppermost reaction zone is greater than that in the two lower reaction zones.

5. The reaction system of claim 2 further characterized in that said third reaction zone has (i) a third lower, imperforate transverse partition connected to said inner and outer catalyst-retaining screens, and to the interior wall of said chamber, terminating at said inner retaining screen, and (ii) a third, upper imperforate transverse partition connected to said inner and outer retaining screens.

6. The reaction system of claim 5 further characterized in that said chamber contains a third fluid stream inlet port between said second upper, imperforate transverse partition and said third lower, imperforate transverse partition.

7. The reaction system of claim 6 further characterized in that said third fluid stream inlet port discharges above said second upper transverse partition upwardly into the center reactant conduit within the third reaction zone.

* * * * *